United States Patent [19]

Surauer et al.

[11] Patent Number: 5,535,965
[45] Date of Patent: Jul. 16, 1996

[54] THREE-AXIS STABILIZED, EARTH-ORIENTED SATELLITE AND A CORRESPONDING SUN AND EARTH ACQUISITION PROCESS

[75] Inventors: Michael Surauer, Chieming; Helmut Bittner; Walter Fichter, both of Munich; Horst-Dieter Fischer, Unterhaching, all of Germany

[73] Assignee: Deutsche Aerospace AG, Munich, Germany

[21] Appl. No.: 204,280

[22] PCT Filed: Sep. 4, 1992

[86] PCT No.: PCT/EP92/02047

§ 371 Date: Jun. 7, 1994

§ 102(e) Date: Jun. 7, 1994

[87] PCT Pub. No.: WO93/04922

PCT Pub. Date: Mar. 18, 1993

[30] Foreign Application Priority Data

Sep. 6, 1991 [DE] Germany .......................... 41 29 630.3

[51] Int. Cl.⁶ ..................................................... B64G 1/36
[52] U.S. Cl. ........................................... 244/174; 244/171
[58] Field of Search ..................................... 244/164, 165, 244/171; 342/355, 356, 357; 250/203.4; 364/434, 459

[56] References Cited

U.S. PATENT DOCUMENTS 5,080,307  1/1992  Smay et al. .............................. 244/171
5,255,879  10/1993  Yocum et al. .......................... 244/171

OTHER PUBLICATIONS

"The Attitude Determination and Control Subsystem of the Intelsat V Spacecraft" published in Proceedings of AOCS Conference, Noordwijk, Oct. 3–6, 1977, ESA SP–128, Nov. 1977, pp. 1–20.

Primary Examiner—Galen L. Barefoot
Attorney, Agent, or Firm—Evenson, McKeown, Edwards & Lenahan

[57] ABSTRACT

A three-axis stabilized, earth-oriented satellite has an attitude control system with regulators, actuators, an earth sensor that carries out measurements along two axes and a sun-sensor arrangement that also carries out measurements along two axes. The field of view of the sun-sensor arrangement covers the round angle on a plane of the satellite-fixed coordinate system. Only the sun-sensor arrangement and the earth sensor act as measurement transducers. A sun and earth acquisition process for such a satellite has the following steps: seeking the sun; setting the sun vector in a first direction of reference; setting the speed of rotation of the satellite around the sun vector at a constant value; setting the sun vector in a second direction of reference, so that by rotating the satellite around the latter the optical axis of the earth sensor sweeps over the earth; and picking up the earth. Special regulating rules are disclosed.

20 Claims, 1 Drawing Sheet

THREE-AXIS STABILIZED, EARTH-ORIENTED SATELLITE AND A CORRESPONDING SUN AND EARTH ACQUISITION PROCESS

The invention relates to a three-axis stabilized, earth-oriented satellite according to the preamble of claim 1 as well as to a process for implementing the sun and earth acquisition in the case of such a satellite.

A satellite of this type is known from H. Bittner, et al. "The Attitude Determination and Control Subsystem of the Intelsat V Spacecraft", published in Proceedings of AOCS Conference, Noordwijk, Oct. 3 to 6, 1977, ESA SP-128, November, 1977. By means of its attitude control system, it is capable of carrying out many different maneuvers which are required in the transfer orbit and in the geostationary orbit, such as the sun acquisition; that is, the alignment of the X-axis of its satellite-fixed system of coordinates (X, Y, Z) with the sun; the earth acquisition; that is the alignment of the Z-axis with the center of the earth; the apogee maneuver; that is the alignment of the Z-axis in the direction of the geostationary orbit in the apogee of the transfer orbit before the injection into the apogee; and finally all simple attitude control maneuvers for continuously maintaining the desired orientation as well as all reacquisition maneuvers when attitude references, such as the sun and/or the earth are lost.

The attitude control system of this known satellite comprises a regulator for using the respective required control laws; actuators, specifically attitude control nozzles, for generating controlling torques about each of the principal axes (X, Y, Z) of the satellite according to control signals emitted by the regulator; as well as sun sensors, an earth sensor, and a redundantly designed gyroscope package, which measures in three axes, for the direct measuring of the components of the rotational speed vector of the satellite with respect to the principal axes of the satellite. The sun sensors have a first field of view which comprises about the negative Z-axis, overall, one half of the XZ-plane and a specific width perpendicularly to it, and a second field of view which comprises about the X-axis overall one third of the XY-plane and a specific width perpendicularly to it. The earth sensor is oriented by means of its optical axis, as customary, in the direction of the Z-axis which, in the geostationary orbit, must be continuously aligned with the center of the earth (earth orientation).

The measured value generator used in the attitude control system include as an essential element a gyroscope package, which measures in three axes, for the direct measuring tracking of the components of the rotational speed vector $\underline{\omega}$ $(\omega_X, \omega_Y, \omega_Z)^T$ of the satellite relative to the satellite-fixed system of coordinates. In the case of the known satellites, these measured values are required because there the control is designed correspondingly in order to be able to carry out the desired attitude control maneuvers. However, the use of gyroscopes of this type has the significant disadvantage that they are electromechanical components on which very high demands are to be made, particularly under the extreme condition of space, and which are very susceptible to disturbances and wear. The resulting required redundant design represents a considerable cost factor.

It is therefore an object of the invention to provide a satellite of the above-mentioned type whose attitude control system is designed as cost-effectively as possible and is nevertheless functionally reliable.

According to the invention, this object is achieved by the characteristics contained in the characterizing part of claim 1.

Accordingly, a sun sensor arrangement is now used whose field of view in a plane of the satellite-fixed system of coordinates—called "field of view plane" 60 here—, for example, the XZ-plane, comprises the full angle of $0 \leq \alpha_1 \leq 2\pi$, wherein $\alpha_1$ is an angle which extends around in this plane from an arbitrarily selected reference direction, approximately the X-axis. Thus, an all-around view is required in the field of view plane. Perpendicularly to it, thus, for example, in the direction of the Y-axis, a minimum width of the field of view must naturally exist so that a two-axis measurement becomes possible.

As an essential characteristic, it is required that only the sun sensor arrangement and the earth sensor exist as the measured value generators for the attitude control system and that therefore gyroscopes are no longer required. For this purpose, special control laws must be used in the regulator which require no direct measured values for the components of the rotational speed vector $\underline{\omega}$ of the satellite and which, for providing the control signals, use only the measuring signals which can be obtained by means of the still existing measured value generators (sun sensors and earth sensor). In view of the control laws to be used and the measuring quantities required in them, all attitude control maneuvers must be designed correspondingly.

In the subclaims, processes are indicated for implementing the sun and earth acquisition which meet the above-mentioned requirements and which may be used in the case of a satellite according to the invention which has no gyroscopes.

Figure 1:
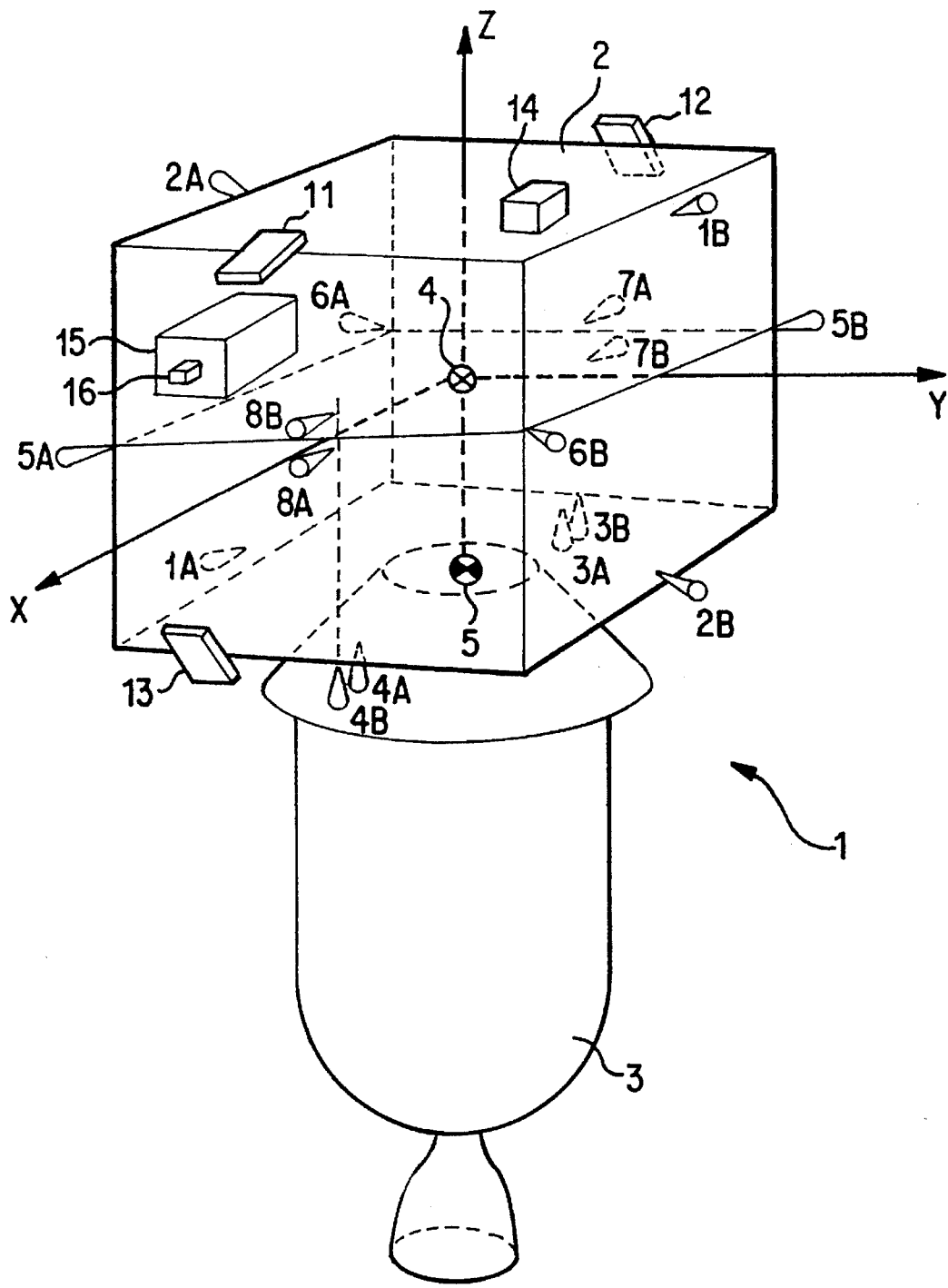
FIG. 1 is a schematic view of a satellite with an orthogonal body axis system, actuators, sun sensors, an earth sensor as well as a docked perigee power unit.

It is known that the sun acquisition is a maneuver which has the purpose of aligning one of the principal axes of the satellite, for example, the X-axis, with the sun. Then, the solar generators, which can be moved out into the direction of the Y-axis and can be rotated about it, can be at least partially unfolded and directed toward the sun in order to ensure in this manner the energy supply, for example, in the transfer orbit, already to a certain minimal extent. The maneuver of the earth acquisition has the purpose of aligning a different principal axis of the three principal axes of the satellite, for example, the Z-axis, with the center of the earth because the antennas on the satellite, which are used for communicating with the earth station or stations, are oriented in this direction. Generally, this maneuver is to be carried out already in the transfer orbit but also in the final geostationary orbit after the implementation of the apogee maneuver.

According to the invention, the sun and earth acquisition are to be carried out as follows, in which case any condition, possibly a tumbling condition, of the satellite is used as the basis:

First, the search for the sun takes place unless the sun is already in the field of view of the sun sensors. In this case, it may frequently occur that the sun enters into the field of view by itself, which field of view may, perpendicularly to the field of view plane, for example, the XZ-plane, have a width of $\pm \alpha_2$ with $\alpha_2 < 90°$, for example, $\alpha_2 = 60°$. The reason may be that the satellite is already rotating about an axis of rotation which extends within the field of view so that then, because of the all-around view, the sun will arrive in the field of view of the sun sensors no later than after half such a rotation. This case is the more likely, the larger the angle $\alpha_2$. On the other hand, the case may also occur that an existing tumbling movement ends, because of energy dissipation by fuel damping and structural damping, in a rotation about a single stable axis, specifically that of the largest moment of inertia. In the case of earth satellites, this axis is generally situated in the XZ-plane which is preferred as the field of view plane.

Should, after a preselectable time period, the sun not have entered the field of view of the sun sensor arrangement, for the purpose of the excitation of a nutational movement, torque pulses about an axis situated in the field of view plane (for example, XZ-plane), may be repeated, if necessary, and may be exercised by means of a respective increased torque level. This nutation movement will then have the certain result that the sun will finally arrive in the field of view of the sun sensors.

Then, the sun line, which is given by the direction of the sun vector $\underline{S} = (S_X, S_Y, S_Z)^T$, must be adjusted to a first reference direction (reference sun vector $\underline{S}_{R1}$), preferably to a principal axis (such as the X-axis) situated in the field of view plane. In order to ensure that, during the earth acquisition which takes place later, the optical axis of the earth sensor does not, because of an excessively fast rotation about an axis of rotation directed perpendicular to this optical axis, sweep too fast over the earth, in order to permit a braking which takes place in time, and, in order to prevent, on the other hand, that this rotation required during the search for the earth takes place much too slowly, the rotational speed $\omega_p$ of the satellite about the sun line is adjusted in the next step to a preselectable constant value, in which case, at the same time, the lateral component $\omega_q$ of the rotational speed of the satellite is damped as much as possible or is suppressed completely. Finally, the sun line must be adjusted to a second reference direction (reference sun vector $\underline{S}_{R2}$) which, as a function of the respective known orbital position of the satellite and of the direction of the optical axis of the earth sensor, is selected such that, when the satellite is rotated about this second reference direction, the optical axis of the earth sensor sweeps over the earth. Since the respective required rotational speed of the satellite about the sun line had already previously been adjusted to an average value and had then been kept constant, the optical axis of the earth sensor may be aligned with the center of the earth during the first earth acquisition.

During the search for the sun by means of an excitation of a nutation movement, the following facts may be assumed: The field of view plane is to be the XZ-plane; the field of view of the sun sensor arrangement perpendicularly to it is to comprise an angle range between $\pm\alpha_2$ with $\alpha_2 < 90°$, a·b·$\alpha_2 = 60°$; and the satellite is to rotate about the Y-axis disposed perpendicularly on the XZ-plane at an angular velocity $\omega$, and have the rotational pulse vector L which has the same direction as the angular velocity vector $\underline{\omega}$. This is the poorest possible configuration before the initiation of the nutation movement. The latter may be excited in that a torque pulse of the pulse duration $$\Delta t = \tan(\pi - \alpha_2) \frac{L}{t_c},$$

$$L = I_Y \omega$$

about the X-axis is generated, with the torque level $t_c$ as well as the moment of inertia $I_Y$ of the satellite with respect to the Y-axis. After a waiting period of $$\Delta t_1 = \frac{2\pi I_T}{L} \cos(\pi - \alpha_2),$$

$$I_T \equiv \max(I_X, I_Z)$$

a new torque pulse, if necessary, with an increased pulse duration, may be exercised if the search for the sun has not yet been successful.

When adjusting the sun line, that is, the direction given by the sun vector $\underline{S}$, to a first reference direction (reference sun vector $\underline{S}_{R1}$), the following control law must be applied $$\underline{\mu} = -\underline{K}_D \underline{L}_D \underline{\omega}_q + \underline{K}_P \underline{L}_P (\widetilde{\underline{S}}_{R1} \cdot \underline{S})$$

$$\underline{\omega}_q = -\widetilde{\underline{S}} \cdot \hat{\underline{S}}$$

wherein $\mu$ is the vector of the control signals assigned to the three axis directions and to be fed to the actuators; $\underline{K}_D$ as well as $\underline{K}_p$ are diagonal amplification matrices; $\underline{L}_D$ and $\underline{L}_P$ are vectorial limiters which limit the length of the vector which follows without changing its direction (this is required in order to ensure the stability of the regulation); $\widetilde{\underline{S}}_{R1}$ is the skew-symmetrical vector product matrix which is to be derived from the components of the reference sun vector $\underline{S}_{R1}$ and which produces the vector product $\underline{S}_{R1} \times \underline{S}$, and $\hat{\underline{S}}$ is the time derivation of the sun vector $\underline{S}$. It is known that the sun vector $\underline{S}$ is a unit vector so that, in the case of a two-axis measuring by means of the sun sensors, the third component results automatically from the two measured components. The time derivation $\hat{\underline{S}}$ is obtained from the measured sun vector $\underline{S}$ by numerical differentiation or via a high pass, preferably of the second order, approximately according to a transmission function (s is the laplace operator) of the type:

$$\hat{\underline{S}} = \frac{(T_1 + T_2)s^2 + s}{(1 + T_1 s)(1 + T_2 s)} \cdot \underline{S}$$

The above-mentioned control law permits the adjusting of the sun vector $\underline{S}$ to the reference sun vector $\underline{S}_{R1}$, in which case the speed at which the sun line is moved into the reference direction is limited. It has a damping effect as long as $\omega_p$ is not equal to 0. It does not control the rotational speed about the sun line; on the contrary, this sun line remains (at least approximately) constant.

The adjusting of the rotational speed $\omega_p$ of the satellite about the sun line to a preselectable constant value takes place according to the following control law:

$$\underline{\mu} = -\underline{K}_D \underline{L}_B \underline{\omega}_q + \underline{K}_P \underline{L}_P (\widetilde{\underline{S}}_{R1} \cdot \underline{S}) + k_s \text{ sign } (c) \underline{S} (|c_R| - |c|)$$

wherein, apart from the above-mentioned quantities, $k_s$ is a scalar amplification factor; c is the level of the rotational speed of the satellite about the sun line; and $c_R$ is the reference value that can be preselected for it. In this control law, the two first terms, as always, control the sun line, as described above, while the third term is now responsible for the control of the rotational speed of the satellite about the sun line to the reference value $c_R$. In this case, the preceding sign (c) and c must be estimated. The third term will be connected only when valid estimated values are present for c.

The estimation of the rotational speed c may take place as follows:

It is a basic prerequisite that the rotation of the satellite about the sun line must/couple into the axes perpendicularly to it because speeds can be measured or estimated only perpendicularly to the sun line. This is automatically ensured when the moments of inertia about the three satellite axes are not all the same. The reason is that from the following basic equation $$\dot{I\omega} + \tilde{\omega}I\omega = \tau$$

with the inertia tensor I, the skew-symmetrical vector product matrix $+e, ot\tilde{I}\omega+ee$ and the acting torque vector $\tau$, the coupled equation system $$I_X \dot{W}_X + (I_Z - I_Y) W_Y W_Z = \tau_X$$
$$I_Y \dot{W}_Y + (I_X - I_Z) W_X W_Z = \tau_Y$$
$$I_Z \dot{W}_Z + (I_Y - I_X) W_X W_Y = \tau_Z$$

is obtained.

If all moments of inertia are identical to one another, the above-mentioned case may be forced in that, by means of a spin wheel in the satellite, a rotational pulse component is artificially generated laterally to the sun line according to $$\dot{I\omega} + \tilde{\omega}(I\omega + h) = \tau$$

In the former case, particularly simple estimation algorithms can be obtained when quasi-stationary condition exist; that is when the following applies: $\underline{S} = \underline{S}_{R1}$ and $+e, cirS+ee = o$. Then the following is obtained $$c^2 = \frac{(\tilde{\underline{S}} \cdot I\underline{S})^T \tau}{|\underline{S} \cdot I\underline{S}|^2}$$

wherein $\tau$ is the controlling torque vector which is to be applied for meeting the condition $\underline{S} = \underline{S}_{R1}$ and $+e, cirS+ee = o$ by means of the control. It is determined by means of the control degrees $a_i$ of the individual actuators, particularly of the attitude control nozzles, according to $$\tau = T_c \underline{a}$$

wherein $T_c$ represents the torque matrix of the respectively used actuator or nozzle set.

The determination of the preceding signs (positive or negative with respect to the direction of $\underline{S}$) takes place in steps in successive time intervals (k, k+1, ...). It is $$\text{sign } (c)_{k+1} = \text{sign } (|c|_{k+1} - |c|_k) \cdot \text{sign } (\tau_s)_k.$$

This may be interpreted as follows: When, in the past time interval (k), the torque $\tau_s$ exercised about the sun line was positive, that is, it had the same direction as $\underline{S}$, and therefore sign $(\tau_s)_k = +1$, and when the amount of the rotational speed about this axis has increased, in the present time interval (k+1), the rotational speed will be positive; i.e. sign $(c)_{k+1} = +1$, etc. The following may be used as initial values (K=C); sign $(c_K) = +/\text{or } -i$ and $|c|_K = 0$.

The preceding sign of the exercised torque about the sun line is:

$$\text{sign } (\tau_s) = \text{sign } (c_k) \cdot \text{sign } (|c_R| - |c|_k)$$

The computation of sign (c) will be carried out only if $$\Delta(c) \equiv |c|_{k+1} - |c|_k$$

exceeds a certain threshold $\Delta o$ in order to eliminate estimating inaccuracies $|c|$.

In addition, stationary conditions may simply be scanned by examining the relationship $$|\hat{S}_i| < c (i = X, Y, Z),$$

wherein c represents a small preset barrier.

In the second of the above-mentioned cases, the rotational speed about the sun line (according to the amount and preceding sign) can be determined by using the known artificially generated rotational pulse $\underline{h}$ and assuming the identical moments of inertia about the three satellite axes, according to the simple relationship:

$$c = \frac{(\tilde{\underline{S}} \cdot \underline{h}) \tau}{|\underline{S} \cdot \underline{h}|^2}$$

As an alternative, the determination of the rotational speed of the satellite may also be carried out as follows:

The actuating of the actuators generating torques about the X-axis is prevented (for example, set to $u_X = 0$). The lateral axis movements (Y, Z-axes) are controlled via the measurable components of the sun vector ($S_Z$, $S_Y$) and their time derivations (+e,cir S+hd Z+ee , +e,cir S+hd Y+ee ), according to the rule:

$$\mu_Y = -k_{DZ} \hat{S}_Z - k_{PZ} (S_Z - S_{RZ}) - \mu_Z = -k_{DY} \hat{S}_Y - k_{PY} (S_Y - S_{RY})$$

The direction of the incidence of the sun in the satellite axes which at first coincides with the satellite X-axis ( $\underline{S}_R = (1, 0, 0)$), is displaced, preferably with a preset, constant speed, specifically:

either in the direction of the Y-axis from the initial "0" value to a preset final value ($S_{RYE}$) according to the rule:

$$o \leq S_{RY}(t) = \Delta S_{RY} \cdot t \leq S_{RYE}$$

in which case the amount of the rotational speed c of the satellite about the X-axis can be determined according to the relationship:

$$C = \sqrt{\frac{k_{PY}}{A} \cdot \frac{(S_{RY} - S_{Y\infty})}{S_{Y\infty}}}$$

or in the direction of the satellite Z-axis from the initial "0" value to a preset final value ($S_{RZE}$) according to the rule:

$$o \leq S_{RZ}(t) = \Delta S_{RZ} \cdot t \leq S_{RZE}$$

In which case the amount of the rotational speed c of the satellite can be determined according to the relationship:

$$C = \sqrt{\frac{k_{PZ}}{B} \cdot \frac{(S_{RZ} - S_{Z\infty})}{S_{Z\infty}}}$$

wherein—in addition to the terms already used above—the corresponding quantities are defined as follows:

$$B = \frac{I_X - I_Z}{I_Y}$$

$$A = \frac{I_X - I_Y}{I_Z}$$

and:

$S_Y\infty$, $S_Z\infty$ are the (Y, Z) components of the sun unit vector in the stationary (that is, swung-in) condition;

$I_X$, $I_Y$, $I_Z$ are the moments of inertia of the satellite about the corresponding axes.

The rotating direction (preceding sign of c) can be determined from the preceding sign (sign) of the preset ($S_{RY}$, $S_{RZ}$) or measurable quantities ($S_{RY}\infty$, $S_{RZ}\infty$) according to the relationships:

$$\text{sign }(c) = \text{sign }[(1-B) \cdot S_{RY}] \cdot \text{sign }(S_Z\infty)$$

in the former case, and in the second case, according to:

$$\text{sign }(c) = \text{sign }[(1-A) \cdot S_{RZ}] \cdot \text{sign }(S_Y\infty)$$

When applied in practice, the preceding sign of the rotational speed (c) may also be determined simply be "testing", in that a torque increment is commanded about the X-axis, and subsequently, the numerical value of the amount of the rotational speed (|c|) is compared with the value before the rotational pulse change. If, when the increment is positive, the amount has become larger, the preceding sign will be positive and vice versa.

In the case of the sun acquisition, during the first adjusting of the sun line to a first reference direction as the reference sun vector $$\underline{S}_{Rq} = (S_{R1X}, S_{R1Y}, S_{R1Z})^T$$

for the measured sun vector $$\underline{S} = (S_X, S_Y, S_Z)^T \text{ (with } |\underline{S}_{R1}|=1 \text{ and } |\underline{S}|=1)$$

the following is at first expediently preset:

$$\underline{S}_{R1} = (S_X, 0, S_Z)^T$$

as long as $|S_Y| \geq C_{SY}$, and $$\underline{S}_{R1} = (1,0,0)^T$$

as soon as $|S_Y| < C_{SY}$, wherein $C_{SY}$ is a preselectable constant. As a result, it is achieved that the sun vector is first guided as fast as possible in the direction of the XZ-plane ($S_{R1Y}=0$, whereas $S_{R1X}=S_X$ and $S_{R1Z}=S_Z$ remain unchanged) in order to prevent that the sun disappears again out of the field of view. It is only then that it is swivelled in the XZ-plane toward the X-axis ($S_{R1Y}=S_{R12}=0$).

After the adjusting of the rotational speed about the sun line, the latter, as a function of the position of the satellite in its orbit or of the earth - satellite - sun constellation, must be swivelled into such a direction $\underline{S}_{R2}$—specifically while maintaining the desired rotation—that this rotation finally leads the optical axis of the earth sensor over the earth. This takes place by means of the application of the above-mentioned control law for the adjusting of $\underline{\omega}_p$, wherein the reference sun vector $\underline{S}_{R1}$ must be replaced by the new, second reference sun vector $\underline{S}_{R2}$, which meets the just mentioned condition.

The preceding statements demonstrate that a three-axis stabilized satellite is capable of operating without any gyroscope during the earth and sun acquisition, and that, for the controlled implementation of these maneuvers in the described manner, the data of the sun sensors and of the earth sensor are sufficient.

This also applies to the apogee maneuver, in the case of which, at the point farthest away from the earth (apogee) in its elliptic transfer orbit, the satellite is injected into the final, almost circular geostationary orbit, specifically by the thrust of the apogee engine which acts into the new orbital direction. If this thrust occurs in the direction of the X-axis, the field of view plane of the two-axis sun sensor arrangement is the XZ-plane, and if the optical axis of the two-axis earth sensor is oriented in the direction of the Z-axis, the apogee maneuver, during which the X-axis must point in the orbital direction, can be carried out without a gyroscope because a three-axis reference exists in this constellation.

In contrast, when the thrust of the apogee engine acts in the direction of the Z-axis, while the sensor constellation remains the same otherwise, the three-axis reference is lost at first because the earth sensor which measures in two axes and looks into the direction of the Z-axis, will no longer have the earth in its field of view. In this case, a gyroscope will also not be necessary if an additional earth sensor exists which is oriented in the direction of the Y-axis and which needs to measure in only one axis.

In the desired orientation in the geostationary orbit, the satellite requires no gyroscopes anyhow because it is always oriented to the earth by means of the earth sensor, and by means of a sufficient opening angle of their field of view in the Y-direction, the sun sensors always have the sun in their field of view. When the desired orientation is lost, it can be reestablished by means of the above-described sun and earth acquisition processes without gyroscopes.

We claim:

1. A three-axis stabilized, earth-oriented satellite, comprising:
   an attitude control system, said attitude control system including:
   a regulator,
   actuators for generating controlling torques about each of the three axes of a satellite-fixed system of coordinates;
   an earth sensor measuring in two axes of said three axes; and
   a sun sensor arrangement measuring in two of said three axes and having a field of view,
   wherein said field of view of said sun sensor arrangement, in a plane of said system of coordinates, has an angle range of from 0° to 360°, and wherein said attitude control system comprises only said sun sensor arrangement and said earth sensor for generating the measured values needed in the attitude control system.

2. For use in a three-axis stabilized, earth-oriented satellite including an attitude control system including a regulator, actuators for generating controlling torques about each of the three axes of a satellite-fixed system of coordinates, an earth sensor measuring in two axes of said three axes, and a sun sensor arrangement measuring in two of said three axes, wherein a field of view of said sun sensor arrangement, in a plane of said system of coordinates, has an angle range of from 0° to 360°, and wherein said attitude control system consists of said sun sensor arrangement and said earth sensor for generating the measured values for the attitude control system, a process for implementing the sun and earth acquisition in the case of a satellite, comprising the process steps of:

a) seeking the sun, whose position in said satellite-fixed system of coordinates is given by a sun vector $\underline{S} = (S_X, S_Y, S_Z)^T$, in order to bring the sun into the field of view of the sun sensor arrangement, b) adjusting a sun line given by the direction of said sun vector $\underline{S}$ to a first reference direction $\underline{S}_{R1}$, c) adjusting a rotational speed $\underline{\omega}_p$ of the satellite about said sun line to a selectable constant value while a lateral component $\underline{\omega}_q$ is substantially suppressed;

d) adjusting said sun line to a second reference direction, which is selected as a function of a respective known orbital position of the satellite and a direction of an optical axis of the earth sensor, in such a manner that, when the satellite is rotated about said second reference direction $\underline{S}_{R2}$, said optical axis of the earth sensor sweeps over the earth; and e) aligning the satellite with the earth using said optical axis of the earth sensor.

3. A process according to claim 2, wherein if when seeking the sun, the sun has not entered the field of view of the sun sensor arrangement after a preselectable time period, torque pulses about an axis situated in the field of view plane are generated for exciting a nutation movement.

4. A process according to claim 2, wherein when the sun line is adjusted to the first reference direction $\underline{S}_{R1}$, the following control law is used in said regulator:

$$\underline{u} = -\underline{K}_D \underline{L}_D \underline{\omega}_q + \underline{K}_P \underline{L}_P (\widetilde{\underline{S}}_{R1} \cdot \underline{S})$$

$$\underline{\omega}_q = -\widetilde{\underline{S}} \cdot \hat{\underline{S}}$$

wherein $\underline{u}$ is a vectorial controlling quantity to be supplied to the actuators, $\underline{K}_D$ and $\underline{K}_P$ are diagonal matrices of attitude and speed amplification factors, $\underline{L}_D$ and $\underline{L}_P$ are vectorial limiting devices, $\underline{\omega}_q$ is the lateral component of the rotational speed $\underline{\omega}$ of the satellite with respect to the sun line, $\widetilde{\underline{S}}_{R1}$ and $\widetilde{\underline{S}}$ are skew-symmetrical vector product matrices, and $\hat{\underline{S}}$ is the estimated value for a time derivation of the sun vector $\underline{S}$.

5. A process according to claim 3, wherein when the sun line is adjusted to the first reference direction $\underline{S}_{R1}$, the following control law is used in said regulator:

$$\underline{u} = -\underline{K}_D \underline{L}_D \underline{\omega}_q + \underline{K}_P \underline{L}_P (\widetilde{\underline{S}}_{R1} \cdot \underline{S})$$

$$\underline{\omega}_q = -\widetilde{\underline{S}} \cdot \hat{\underline{S}}$$

wherein $\underline{u}$ is a vectorial controlling quantity to be supplied to the actuators, $\underline{K}_D$ and $\underline{K}_P$ are diagonal matrices of attitude and speed amplification factors, $\underline{L}_D$ and $\underline{L}_P$ are vectorial limiting devices, $\underline{\omega}_q$ is the lateral component of the rotational speed $\underline{\omega}$ of the satellite with respect to the sun line, $\widetilde{\underline{S}}_{R1}$ and $\widetilde{\underline{S}}$ are skew-symmetrical vector product matrices, and $\hat{\underline{S}}$ is the estimated value for a time derivation of the sun vector $\underline{S}$.

6. A process according to claim 2, wherein during the adjusting of the rotational speed $\underline{\omega}_p$ of the satellite about the sun line to a constant value, the following control law is used in the regulator:

$$\underline{u} = -\underline{K}_D \underline{L}_D \underline{\omega}_q + \underline{K}_P \underline{L}_P (\widetilde{\underline{S}}_{R1} \cdot \underline{S}) + k_S \, \text{sign}(c) \underline{S}(|c_R| - |c|)$$

wherein $k_s$ is a scalar amplification factor, $c = |\omega_p|$ is the rotational speed about the sun line, and $c_R$ is the corresponding reference value.

7. A process according to claim 3, wherein during the adjusting of the rotational speed $\underline{\omega}_p$ of the satellite about the sun line to a constant value, the following control law is used in the regulator:

$$\underline{u} = -\underline{K}_D \underline{L}_D \underline{\omega}_q + \underline{K}_P \underline{L}_P (\widetilde{\underline{S}}_{R1} \cdot \underline{S}) + k_X \, \text{sign}(c) \underline{S}(|c_R| - |c|)$$

wherein $k_s$ is a scalar amplification factor, $c = |\omega_p|$ is the rotational speed about the sun line, and $c_R$ is the corresponding reference value.

8. A process according to claim 4, wherein during the adjusting of the rotational speed $\underline{\omega}_p$ of the satellite about the sun line to a constant value, the following control law is used in the regulator:

$$\underline{u} = -\underline{K}_D \underline{L}_D \underline{\omega}_q + \underline{K}_P \underline{L}_P (\widetilde{\underline{S}}_{R1} \cdot \underline{S}) + k_S \, \text{sign}(c) \underline{S}(|c_R| - |c|)$$

wherein $k_s$ is a scalar amplification factor, $c = |\omega_p|$ is the rotational speed about the sun line, and $c_R$ is the corresponding reference value.

9. A process according to claim 6, wherein when quasi-stationary conditions exist with $\underline{S} = \underline{S}_{R1}$ and $\dot{\underline{S}} = 0$, an amount of the rotational speed c is determined according to the following rule:

$$c^2 = \frac{(\tilde{\underline{S}} \cdot I \underline{S})^T \underline{\tau}}{|\tilde{\underline{S}} \cdot I \underline{S}|^2}$$

wherein I is an inertia tensor of said satellite with respect to its satellite-fixed system of coordinates, and $\underline{\tau}$ is a controlling torque applied for adjusting the sun line.

10. A process according to claim 7, wherein when quasi-stationary conditions exist with $\underline{S} = \underline{S}_{R1}$ and $\dot{\underline{S}} = 0$, and $\ddot{\underline{S}} = 0$, an amount of the rotational speed c is determined according to the following rule:

$$c^2 = \frac{(\tilde{\underline{S}} \cdot I \underline{S})^T \underline{\tau}}{|\tilde{\underline{S}} \cdot I \underline{S}|^2}$$

wherein I is an inertia tensor of said satellite with respect to its satellite-fixed system of coordinates, and $\underline{\tau}$ is a controlling torque applied for adjusting the sun line.

11. A process according to claim 8, wherein when quasi-stationary conditions exist with $\underline{S} = \underline{S}_{R1}$ and $\dot{\underline{S}} = 0$, an amount of the rotational speed c is determined according to the following rule:

$$c^2 = \frac{(\tilde{\underline{S}} \cdot I \underline{S})^T \underline{\tau}}{|\tilde{\underline{S}} \cdot I \underline{S}|^2}$$

wherein I is an inertia tensor of said satellite with respect to its satellite-fixed system of coordinates, and $\underline{\tau}$ is a controlling torque applied for adjusting the sun line.

12. A process according to claim 9, wherein said controlling torque $\underline{\tau}$ is determined according to the rule:

$$\underline{\tau} = T_c \underline{a}$$

wherein $T_c$ is a torque matrix of the respectively used set of actuators and $\underline{a}$ is a vector representing controlling degrees of the actuators.

13. A process according to claim 10, wherein said controlling torque $\underline{\tau}$ is determined according to the rule:

$$\underline{\tau} = T_c \underline{a}$$

wherein $T_c$ is a torque matrix of the respectively used set of actuators and $\underline{a}$ is a vector representing controlling degrees of the actuators.

14. A process according to claim 11, wherein said controlling torque $\underline{\tau}$ is determined according to the rule:

$$\underline{\tau} = T_c \underline{a}$$

wherein $T_c$ is a torque matrix of the respectively used set of actuators and $\underline{a}$ is a vector representing controlling degrees of the actuators.

15. A process according to claim 9, wherein a preceding sign of the rotational speed c is determined from the preceding sign of the change of the amount of the rotational speed, which occurred after the expiration of a time interval because of the affecting controlling torque $\underline{\tau}$, while taking into account the direction of the controlling torque at the beginning of the time interval.

16. A process according to claim 12, wherein a preceding sign of the rotational speed c is determined from the preceding sign of the change of the amount of the rotational speed, which occurred after the expiration of a time interval because of the affecting controlling torque $\underline{\tau}$, while taking into account the direction of the controlling torque at the beginning of the time interval.

17. A process according to claim 6, wherein in the presence of a rotational pulse component $\underline{h}$ laterally to the sun line, the amount of the rotational speed c is determined according to the rule $$c = \frac{(\underline{\tilde{S}} \cdot \underline{h}) \underline{\tau}}{|\underline{\tilde{S}} \cdot \underline{h}|^2} .$$

18. A process according to claim 7, wherein in the presence of a rotational pulse component $\underline{h}$ laterally to the sun line, the amount of the rotational speed c is determined according to the rule $$c = \frac{(\underline{\tilde{S}} \cdot \underline{h}) \underline{\tau}}{|\underline{\tilde{S}} \cdot \underline{h}|^2} .$$

19. A process according to claim 8, wherein in the presence of a rotational pulse component $\underline{h}$ laterally to the sun line, the amount of the rotational speed c is determined according to the rule $$c = \frac{(\underline{\tilde{S}} \cdot \underline{h}) \underline{\tau}}{|\underline{\tilde{S}} \cdot \underline{h}|^2} .$$

20. A three-axis stabilized, earth-oriented satellite, having an attitude control system, the improvement wherein said attitude control system includes a regulator, actuators for generating controlling torques about each of the three axes of a satellite-fixed system of coordinates; an earth sensor measuring in two axes of said three axes, and a sun sensor arrangement measuring in two of said three axes and having a field of view, wherein said field of view of said sun sensor arrangement, in a plane of said system of coordinates, has an angle range of from 0° to 360°, and wherein for generating the measured values needed in the attitude control system said sun sensor arrangement and said earth sensor are provided without any gyro arrangement.

* * * * *